United States Patent [19]

Gamadi

[11] Patent Number: 5,249,591
[45] Date of Patent: Oct. 5, 1993

[54] FOLDABLE CAMOUFLAGE ASSEMBLY

[76] Inventor: Zvi Gamadi, 22 Benyamin Boulevard, Netanya, Israel

[21] Appl. No.: 715,803

[22] Filed: Jun. 14, 1991

[30] Foreign Application Priority Data

Jun. 15, 1990 [IL] Israel .................................. 94739

[51] Int. Cl.⁵ .......................................... E04H 15/28
[52] U.S. Cl. .................................... 135/98; 135/99; 135/103; 135/106; 403/55; 403/178
[58] Field of Search .................. 135/98, 99, 103, 104, 135/107–109, 106, 16, 20.1; 403/55, 64, 84, 102, 174, 178

[56] References Cited

U.S. PATENT DOCUMENTS

| | | | |
|---|---|---|---|
| 1,774,909 | 9/1930 | Wells | 135/98 |
| 2,076,525 | 4/1937 | Bouma | 135/25.2 |
| 2,103,948 | 12/1937 | Jones | 135/98 X |
| 2,215,738 | 9/1940 | Kohler | 135/25.2 |
| 2,545,843 | 3/1951 | Cohan | 403/84 X |
| 2,808,065 | 10/1957 | Ellis | 135/108 |
| 3,757,476 | 9/1973 | Schoen | 403/64 X |
| 3,867,019 | 2/1975 | Eyerman | 135/108 X |
| 3,929,146 | 12/1975 | Maiken | 135/98 |
| 4,066,089 | 1/1978 | Rainwater | 135/109 X |
| 4,074,682 | 2/1978 | Yoon | 135/109 |
| 4,111,217 | 9/1978 | Victor | 135/109 X |
| 4,198,996 | 4/1980 | Keable et al. | 135/108 X |
| 4,326,301 | 4/1982 | Brock | 135/98 X |
| 4,327,520 | 5/1982 | Saxby et al. | 135/98 X |
| 4,364,193 | 12/1982 | Visco | 135/901 X |
| 4,750,509 | 6/1988 | Kim | 135/98 X |
| 4,929,113 | 5/1990 | Shen | 403/84 X |
| 4,981,387 | 1/1991 | Younjae | 403/174 |

FOREIGN PATENT DOCUMENTS

0594358  3/1960  Canada .................................. 135/104

Primary Examiner—Carl D. Friedman
Assistant Examiner—Lan M. Mai
Attorney, Agent, or Firm—Ladas & Parry

[57] ABSTRACT

A foldable assembly structure to be used for camouflage nets which comprise a central telescopic pole composed of a plurality of sections which fit into each other, provided with fastening means. The upper free end of said pole is provided with a joint like member from which extend a plurality of foldable arms.

3 Claims, 6 Drawing Sheets

FOLDABLE CAMOUFLAGE ASSEMBLY

FIELD AND BACKGROUND OF THE INVENTION

The present invention relates to a foldable camouflage assembly and more particularly but not exclusively to a foldable structure to be used for camouflage nets or any other camouflage materials placed on said structure.

Camouflage nets are widely used by different army units in order to conceal either men or a large variety of objects from being seen, spotted and photographed by the enemy. In the absence of camouflage nets, any other material to be found is used for the purpose of concealment.

Those acquainted with the use of camouflage nets or other materials are well aware that the mere placing of a camouflage net over the object to be concealed does not sufficiently meet the intended purpose, since the net so placed hangs over the object which is easily spotted by a skilled air observer or ground observer who being led by the outline and bulk of the covered mass could easily conclude the kind and nature of the covered subjects. In the absence of a camouflage net the situation is even worse. Tree branches, bushes and the like are being used to build a concealment for either men or equipment.

To avoid the mere hanging and spreading of a camouflage net over an object, it is customary to add objects under the net so as to change the general appearance of its shape and peripheral outline.

It is customary with troops to stick under the net rods, sticks, tree branches or any other objects which are found at the location of a specific object which is to be concealed.

In the absence of a net it is customary with troops to build a camouflaged hideaway from the material found at that specific place. Either way with or without a camouflage net the art of good camouflage resides in the ability to merge with the surroundings of a given place.

OBJECTS AND SCOPE OF THE INVENTION

It is thus the primary object of the present invention to provide a device to be used as a structure for camouflage materials such as branches, bushes and the like.

It is a further object of the present invention to provide a device to be used as "shape breaker" under camouflage nets.

It is yet a further object of the present invention to provide a foldable structure which could be adjusted for use under camouflage material or under camouflage nets.

According to the invention there is provided a central telescopic pole composed of a plurality of sections which fit into each other, fastening means being provided to secure each section relative to the vicinal one at any given point, at the upper free end of said pole there being provided a joint like member from which extend a plurality of foldable arms, made of pivotally connected sections, fastening means being provided at said pivoting connections.

BRIEF DESCRIPTION OF DRAWINGS

The invention will now be described with reference to the annexed drawings which illustrate by way of example an assembly according to the invention.

FULL DESCRIPTION OF THE INVENTION

Figure 1:
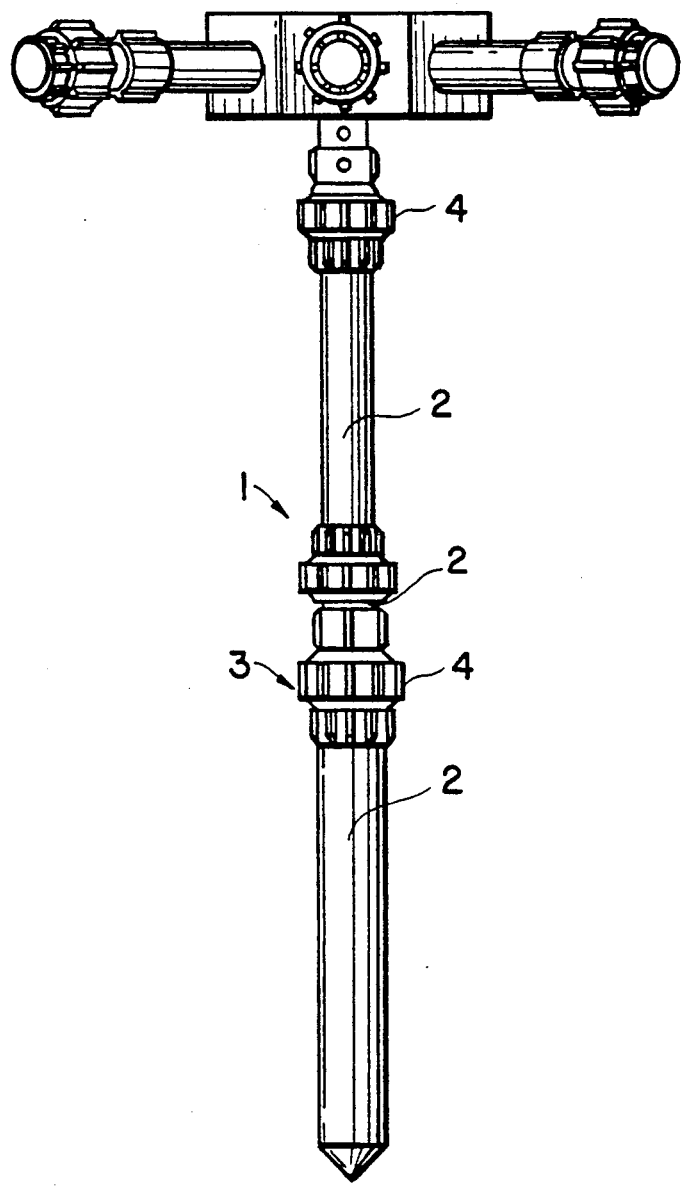
FIG. 1 illustrates a side view of the assembly according to the invention.

Turning first to FIG. 1, the central pole 1 comprises a plurality of sections 2 one placed within the other as is well known. At both ends of each section there are provided fastening means 3 consisting of internally screw threaded nut like rings screwing onto externally screw threaded ends of a section of the telescopic pole, such that as in the present case by turning member 4 it is possible to secure or release each section in a known manner.

Figure 2:
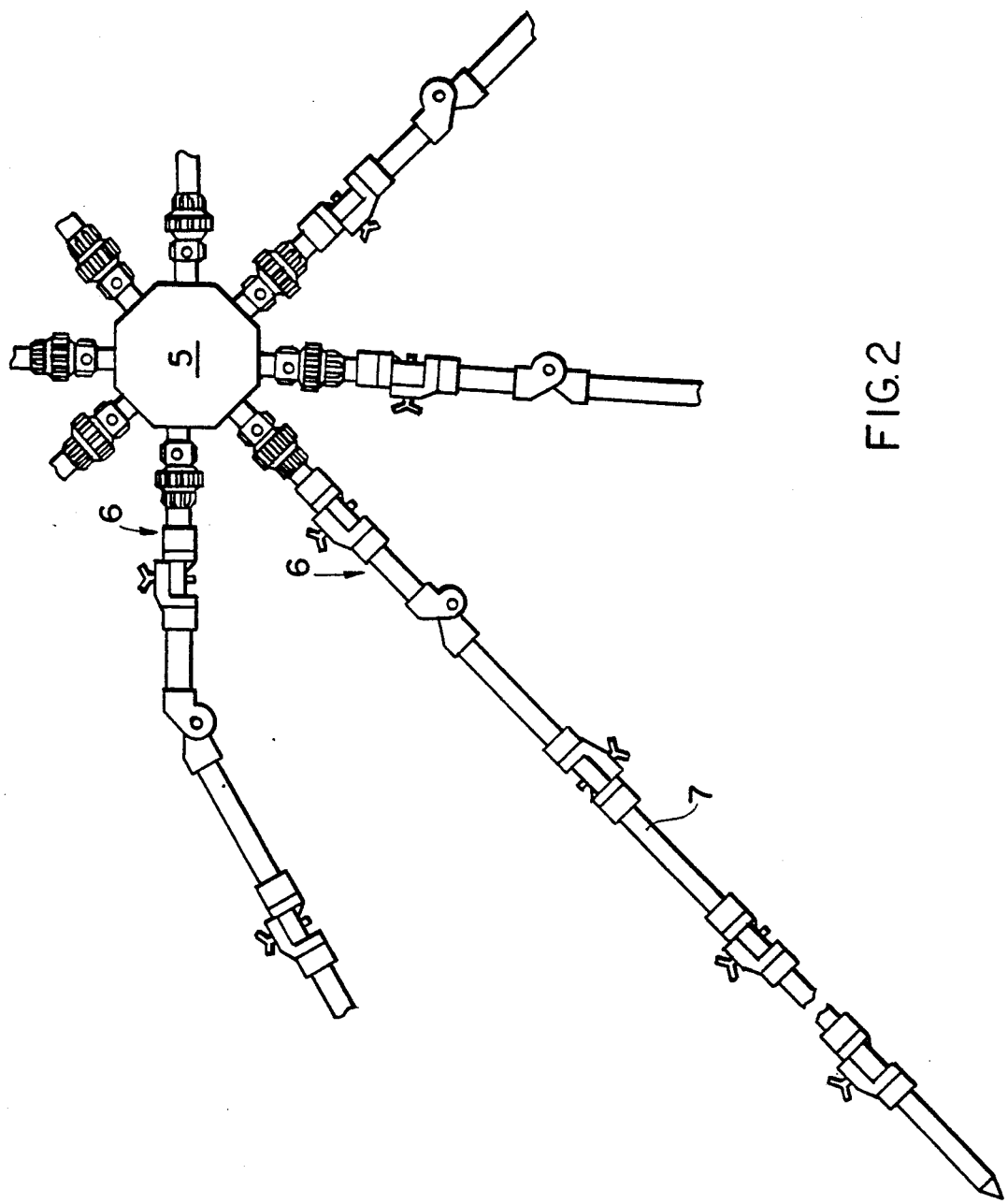
FIG. 2 is a top view of the upper part of the assembly according to the invention.
Figure 3:
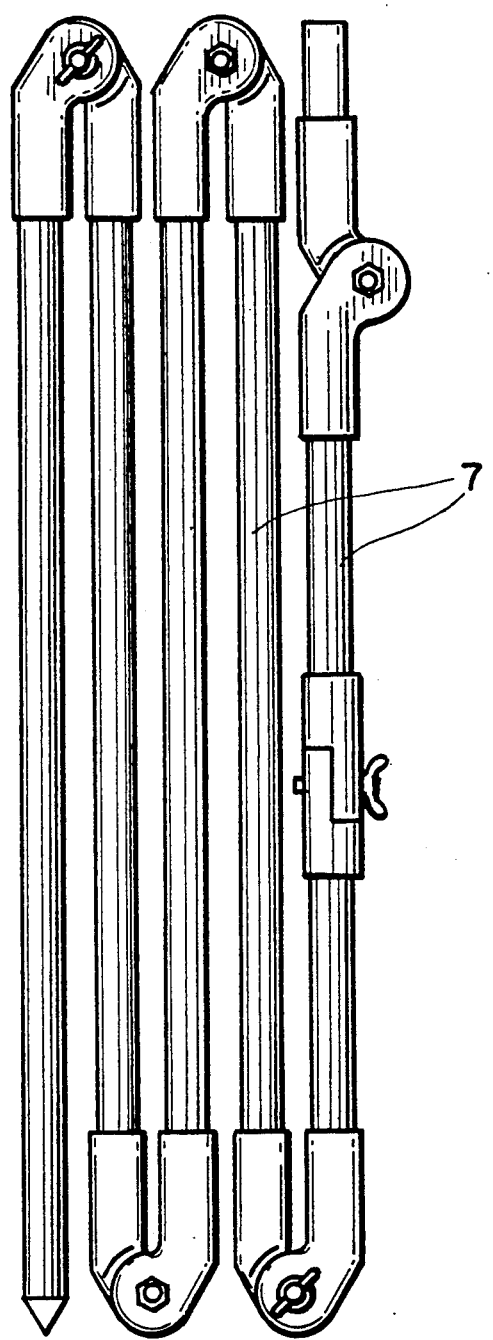
FIG. 3 is a folded arm of the assembly.

At the upper end of the central pole 1 a joint like member 5 (FIG. 2) is connected, from which extend eight (at the present example) foldable arms 6 composed of a plurality of sections 7. Said sections being pivotally connected, in such a manner that the angle between two adjacent sections could be determined and fastened by means of fastener 8.

Figure 4:
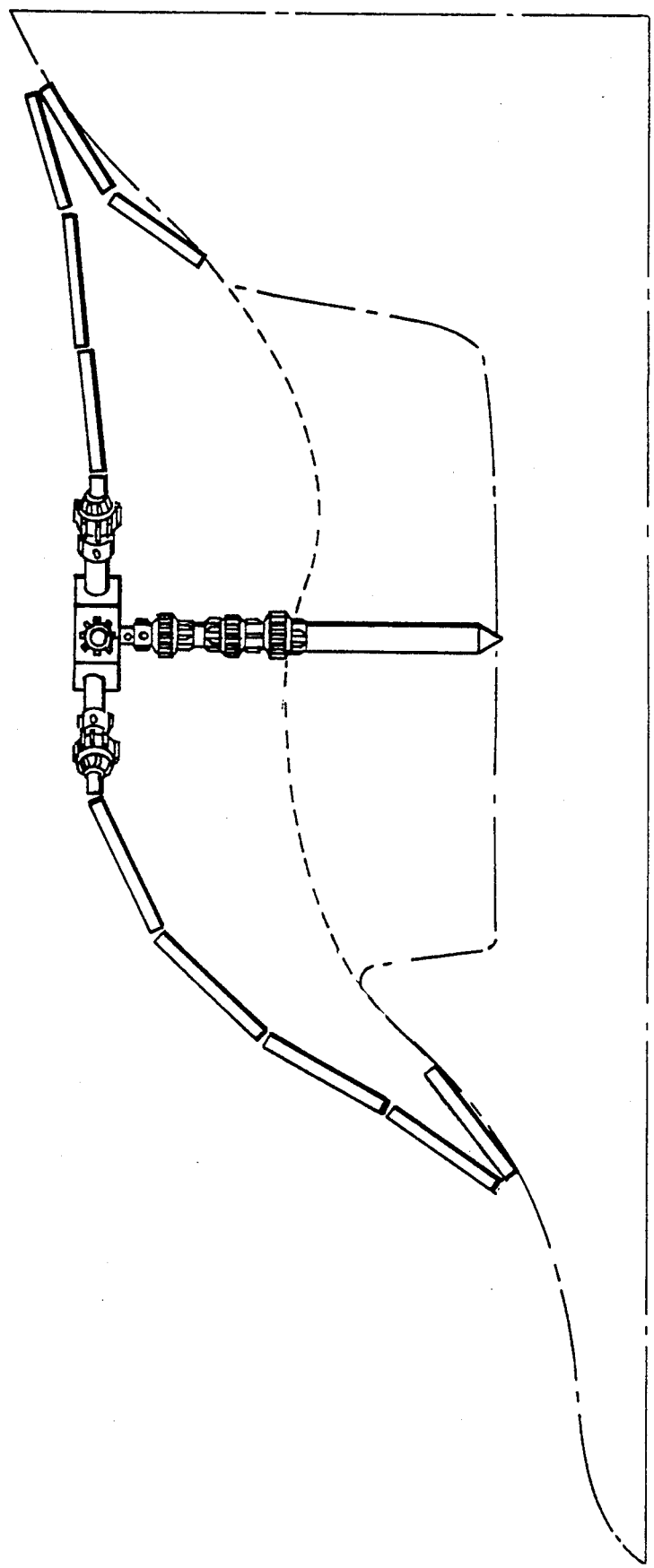
FIGS. 4 and 5 illustrate the use of the assembly at different locations.
Figure 5:
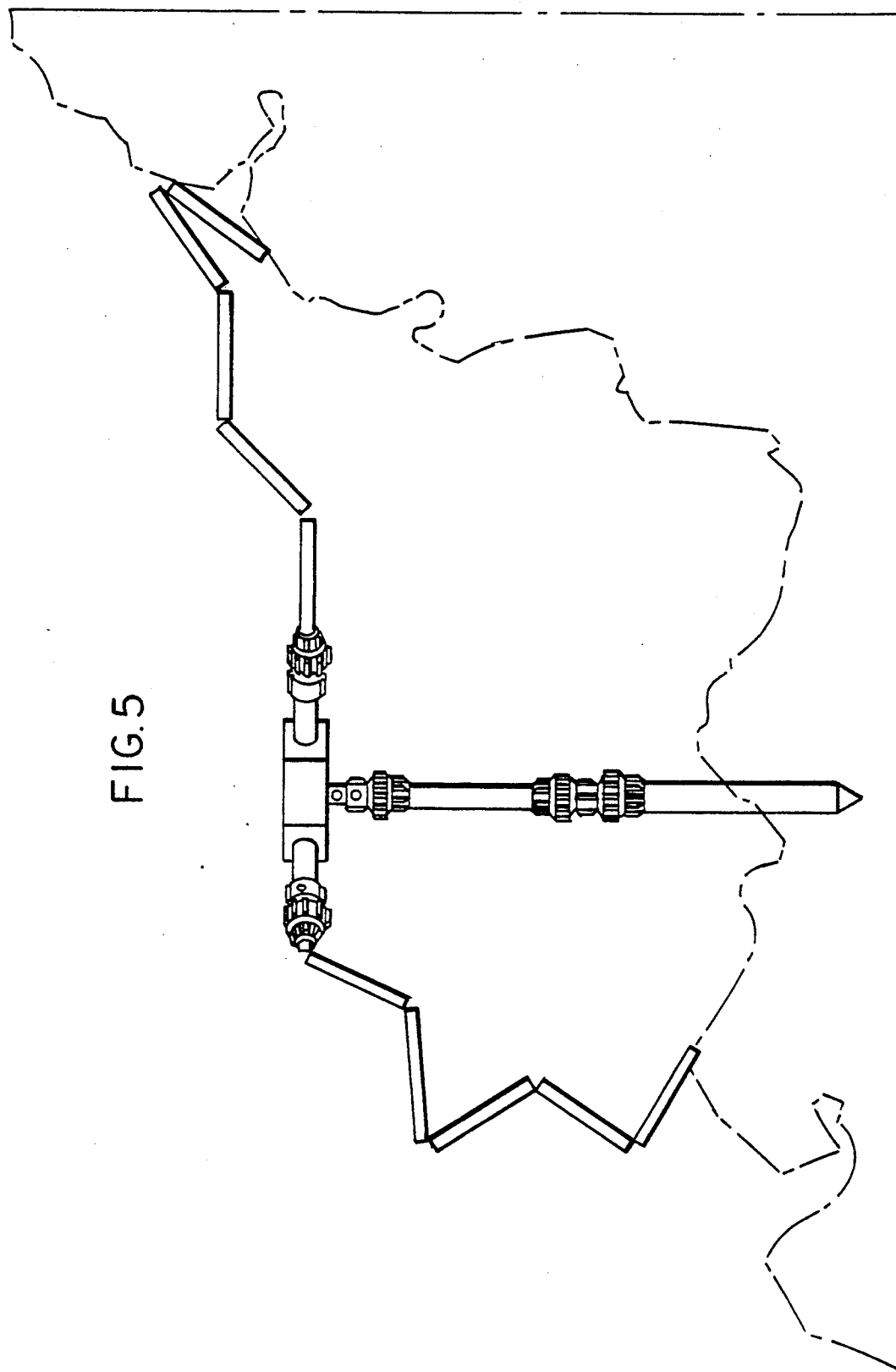

In practice when the assembly is to be used, all fasteners are released, the central pole 1 is placed at the desired location and extended to the required length and secured by means of member 4. Likewise arms 6 unfold in a manner shown in FIGS. 4 and 5. It is possible to pile bushes, branches, sticks, poles against the structure build a hut or shade like hideaway or to place over the structure a camouflage net.

Figure 6:
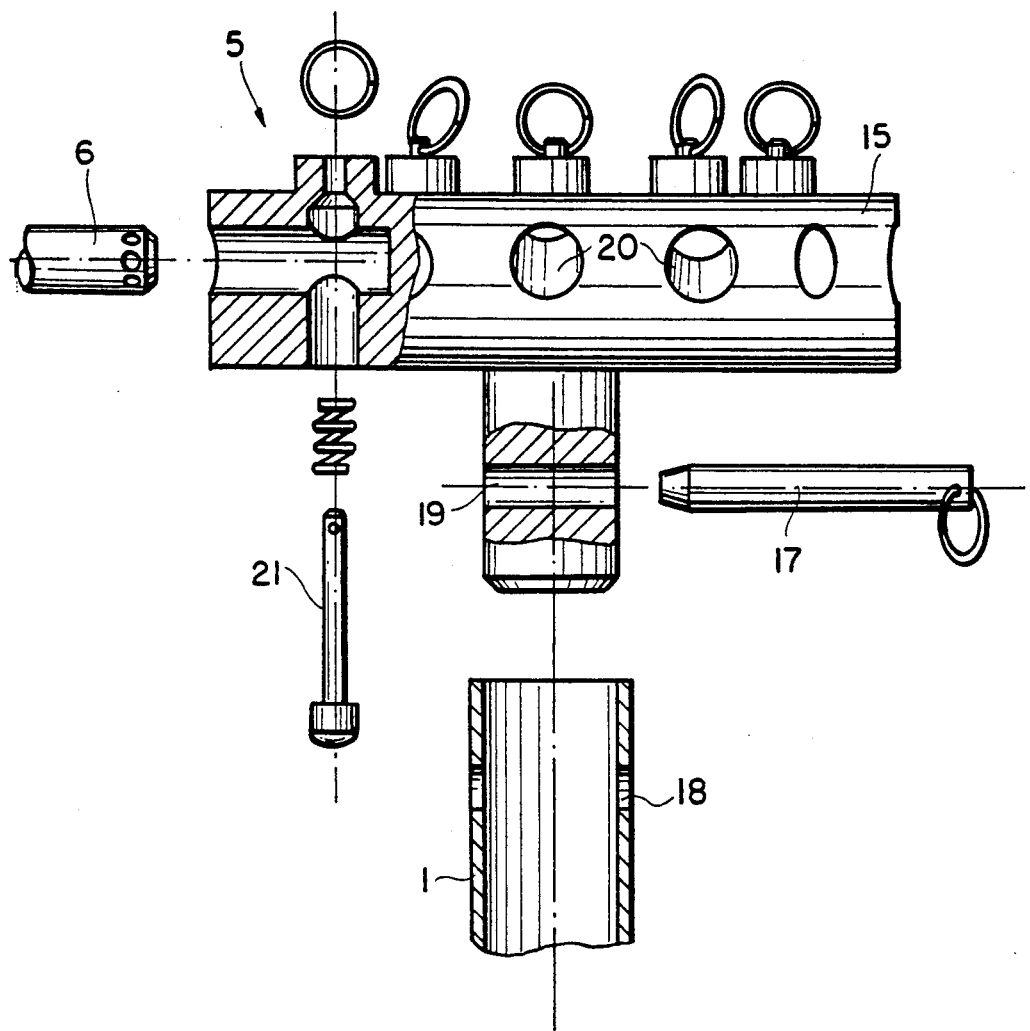
FIG. 6 is a detailed embodiment of the upper part of the assembly.

FIG. 6 illustrates a further embodiment of joint 5 which comprises a circular (or any other shape) member 15, a protrusion 16 adapted to fit into central pole 1 and fastened thereto by pin 17 which passes through hole 18 and bore 19. Member 15 is further provided with a plurality of bores 20 into which fit arms 6 and secured by means of a spring biased pin 21. Each of bores 20 may be in a different angle.

It is obvious that though the invention relates primarily to an assembly for purposes as stated above, it would be within the scope of the invention to use the assembly for a large number of civilian purposes, such as camping and the like.

The material of which the assembly is made could be metal or plastics or any material conveniently used for like purposes.

I claim:

1. A foldable camouflage assembly which comprises a central telescopic pole composed of a plurality of sections which fit into each other, securing means being provided to telescopically secure said sections together, said pole having an upper free end and a lower free end, at the upper free end of said pole there being provided a joint like member from which extend a plurality of foldable arms, made of pivotally connected arm sections, a first of said foldable arms comprising first arm sections with first fastening means for fixing the first arm sections to said joint like member in any of a plurality of angles with respect to one another, a second of said foldable arms comprising second arm sections with second fastening means for fixing the second arm sections to said first arm sections in any of a plurality of angles with respect to one another, said first and second fastening means being operable independently of one another such that the assembly can be fixed in any of a plurality of shapes with the first arm sections fixed with respect to one another at a certain angle or angles and with the second arm sections fixed with respect to one another at said certain angle or angles or at a different angle or angles.

2. A foldable camouflage assembly as claimed in claim 1, wherein the free lower end of said central pole is pointed.

3. A foldable camouflage assembly as claimed in claim 1, where the upper joint like member is provided with bores in different angles.

* * * * *